United States Patent [19]
Gillespie

[11] Patent Number: 5,848,765
[45] Date of Patent: Dec. 15, 1998

[54] REDUCED AMPLITUDE CORRUGATED WEB SPAR

[75] Inventor: Timothy E. Gillespie, Seattle, Wash.

[73] Assignee: The Boeing Company, Seattle, Wash.

[21] Appl. No.: 667,838

[22] Filed: Jun. 20, 1996

[51] Int. Cl.⁶ .................. B64C 1/06; B64C 3/18
[52] U.S. Cl. .................. 244/124; 244/123; 244/120; 244/131
[58] Field of Search .................. 244/117, 119, 244/120, 123, 124, 131, 132

[56] References Cited

U.S. PATENT DOCUMENTS

| | | | |
|---|---|---|---|
| 2,749,061 | 6/1956 | Franz | 244/123 |
| 2,997,262 | 8/1961 | Kirk et al. | 244/123 |
| 3,995,081 | 11/1976 | Fant et al. | 428/119 |
| 4,025,996 | 5/1977 | Saveker | 244/123 |
| 4,084,029 | 4/1978 | Johnson et al. | 244/123 |
| 4,198,018 | 4/1980 | Brault | 244/119 |
| 4,232,093 | 11/1980 | Miller | 244/123 |
| 4,643,933 | 2/1987 | Picken | 428/116 |

OTHER PUBLICATIONS

Report MOC A3559; "Spar Web General Shear Stability Analysis," Jun. 20, 1975.

*Primary Examiner*—V. Lissi Mojica
*Attorney, Agent, or Firm*—Christensen O'Connor Johnson & Kindness PLLC

[57] ABSTRACT

A reduced amplitude corrugated web spar for use in airplane wings and the like is disclosed. The amplitude of the corrugation is determined based upon general stability requirements of the spar, and the fasteners are offset from the center line of the web corrugations. The resulting spar is easier to manufacture and still provides the structural integrity required of the wings.

1 Claim, 5 Drawing Sheets

REDUCED AMPLITUDE CORRUGATED WEB SPAR

FIELD OF THE INVENTION

This invention relates to aircraft, and more particularly relates to reinforcing structures within the wings, fuselage, and empennage of an airplane.

BACKGROUND OF THE INVENTION

Because the general structure of the frames for the wings, fuselage, and empennage are similar, for ease of reference only the frame and structure of the wings will be described. The wings for an airplane undergo a large amount of stress during flight of the airplane. A typical wing structure includes outer surfaces, or "skins" attached to an internal frame. The frame of the wing includes a number of reinforcements, called "spars," that lie vertically within the wing extending from the body of the plane to the outer tip of the wing. The skin is attached to the spars and the spars provide structural integrity for the wings.

The wings of an airplane must be designed to withstand the forces that occur during operation. During flight maneuvers, enormous forces are placed on the spars and other frame members of the wing. The forces are a result of aerodynamic and inertia loads. A rolling maneuver results in centripetal acceleration which pressurizes the fuel in the wing. Fuel pressure forces applied to the skins are counteracted by the spars and frames. To prevent release of the skins from the spars, the spars and the attachment of the spars to the skins must have adequate "pull-off strength". The frames of the wing must also be capable of withstanding shear loads that occur during flight. The frames must have sufficient stiffness to support the general stability of the wing skins, and avoid flutter.

There are considerations other than strength to take into account when designing a frame for a wing. A frame must not only have structural strength which allows the wing to withstand stresses during flight, but also be lightweight so as to maximize the efficiency of the airplane. Moreover, wings are usually designed to hold the fuel for the airplane. Any non-accessible voids created in the interior of the wing by the frame are volume that cannot be used to store fuel. Frame volume also reduces fuel storage. Thus, it is preferred that frames be made of members that permit fuel to flow within a wing and do not require a large volume. Minimizing the volume becomes especially important when designing new supersonic fighters that have low-profile wings.

It is desirable, therefore, that the frame for the wings have minimum weight and volume while offering sufficient structural strength. Prior art aircraft have utilized corrugated spars to enforce wing structures. Corrugated spars have the appearance of an I-beam construction, with the web or central portion of the beam having a corrugated shape. The corrugations extend perpendicular to and between the top and bottom flanges of the I-beams. Corrugated spars are usually made of a laminar composite, such as a woven graphite fiber composite. The matrix material is typically a resin such as epoxy. These composite corrugated spars provide a lightweight, low volume approach to reinforcing a wing.

Prior art corrugated web spars utilized corrugation designs whose amplitude and wavelength were determined by fastener location requirements. An example of a prior art corrugated web spar is shown in FIG. 6. Fasteners on the prior art planes are arranged linearly along the length of the bottom and top flanges of the corrugated web spars. The fasteners extend into the top and bottom flanges of the web spars and are located in the valleys defined by the corrugations. A large number of fasteners are required to provide adequate pull-off strength. Fastener spacing on prior art corrugated web spars is usually in the range of 5 to 7 times the fastener diameter. Because the fasteners were located in a single line extending down the center of the spar, the wavelength of the previous corrugated web designs is twice the fastener spacing, or 10 to 14 times the fastener diameter.

The fasteners are attached one flange of the spar by a nut or collar, and the other flange by a nut plate. In order for the nuts and nut plates to avoid interference with the corrugated web, prior art web spars require a minimum corrugation amplitude. The short wavelength and the required minimum corrugation amplitude resulted in spars having a geometry that was difficult to manufacture. Thus, there exists a need for a more easily produced corrugated web spar.

SUMMARY OF THE INVENTION

The present invention provides a reduced amplitude corrugated web spar. To resolve many of the above problems, the present invention reduces the amplitude of the corrugation, and offsets the fasteners from the spar center line, resulting in a reduced amplitude corrugated web spar. The resulting spar is easier to manufacture and still provides the structural integrity required by the wings of an airplane.

More particularly described, the present invention provides a method of forming a corrugated web spar for use as a support structure in an airplane. The method includes the steps of determining the general stability required of the corrugated spar and forming the corrugated spar with corrugations having an amplitude that meets the determined general stability requirements. If fasteners are used, it is preferred that the fasteners are offset from the center line of the corrugated spar the minimum distance required so that the fasteners do not interfere with the web of the corrugated spar.

The present invention further provides a corrugated web spar for use as a support structure in an airplane. The corrugated web spar includes a top flange, a bottom flange, and a corrugated web sheet extending between the top flange and the bottom flange, the corrugated web including corrugations having an amplitude which is substantially equivalent to the minimum amplitude required to meet the general stability design requirements of the corrugated spar. Preferably, the corrugated web spar also includes fastener holes in the top and bottom flanges for attaching an airplane skin to the corrugated web spar, the fastener holes being offset on the top and bottom flanges from the center line of the corrugated sheet so that the fasteners do not interfere with the corrugated sheet.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 6 is an elevational view of the bottom half of a prior art corrugated web spar.

DETAILED DESCRIPTION OF THE PREFERRED EMBODIMENT

Figure 1:
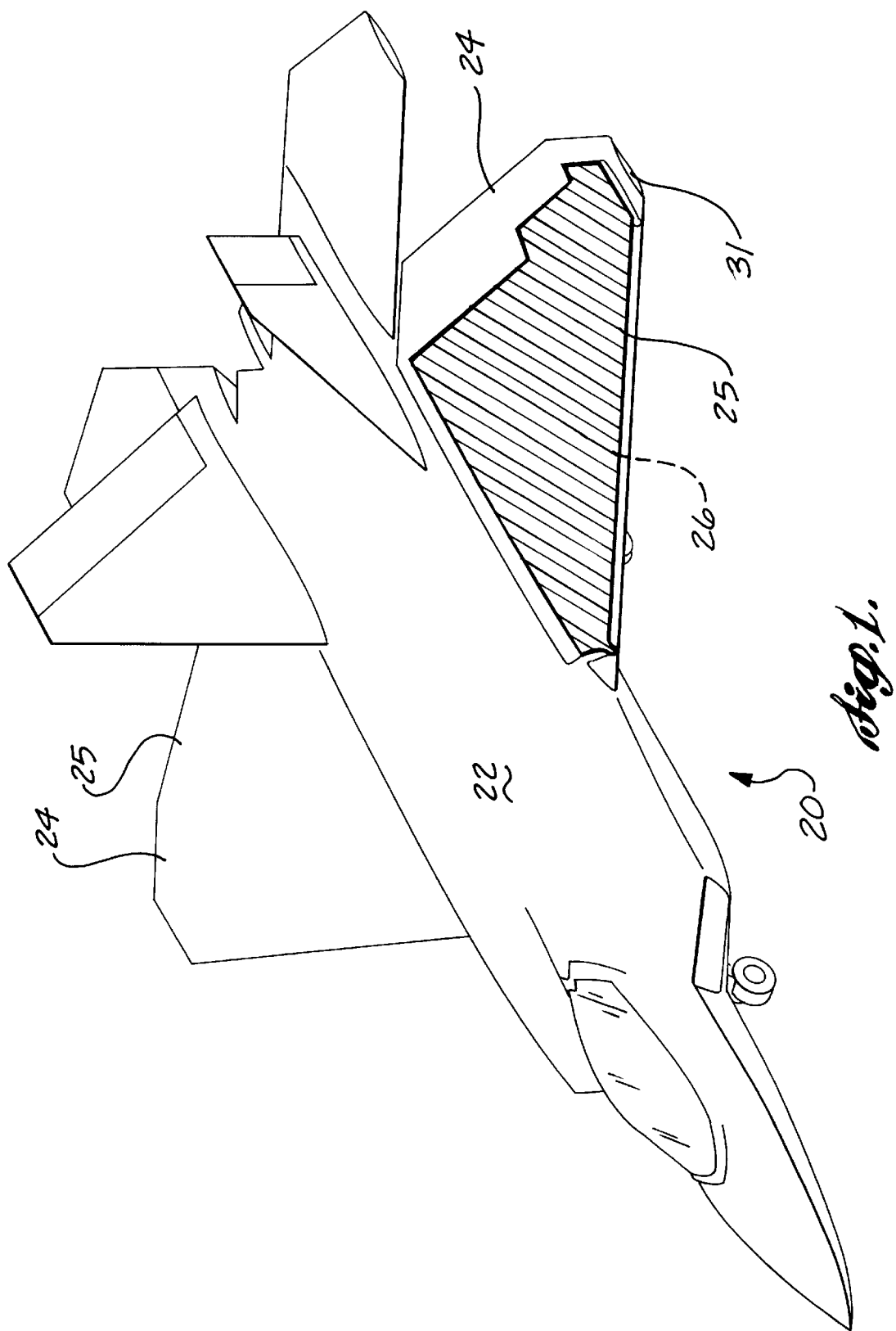
FIG. 1 is a side perspective view of an airplane incorporating a corrugated web spar formed in accordance with the present invention.
Figure 2:
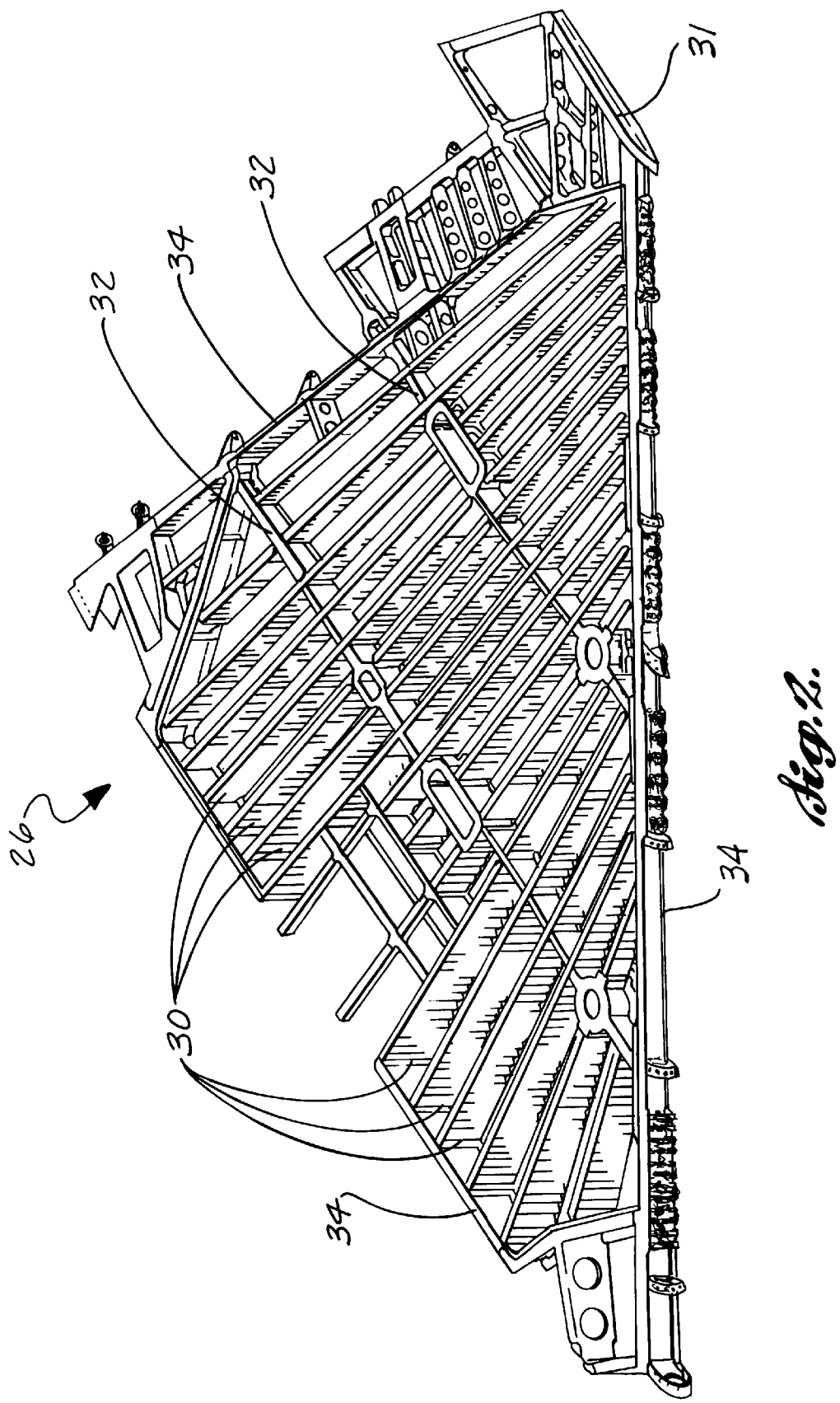
FIG. 2 is a perspective view of the frame of the port wing of the airplane of FIG. 1.

Turning now to the drawings, in which like reference numerals represent like parts throughout the several views, FIG. 1 illustrates an airplane 20 incorporating the present invention. The airplane 20 includes a body (or fuselage) 22 and wings 24. The wings 24 each have skins 25 attached to an internal frame 26. The frame 26 is shown in detail in FIG. 2.

The frame 26 includes a plurality of corrugated web spars 30 extending from the body 22 of the airplane 20 out toward the tip 31 of the wing 24. A number of cross-braces 32 extend across the frame 26. In addition, end pieces 34 extend around the outer perimeter of the frame 26.

The corrugated web spars 30 are preferably made from a woven graphite-fiber composite. The density and arrangement of the fibers in the structure, as well as their orientation and arrangement, can be chosen by a person of skill in the art to achieve desired structural features. In addition, a variety of matrix materials may be used, including both thermosets and thermoplastics. An example of a matrix material is epoxy.

Figure 3:
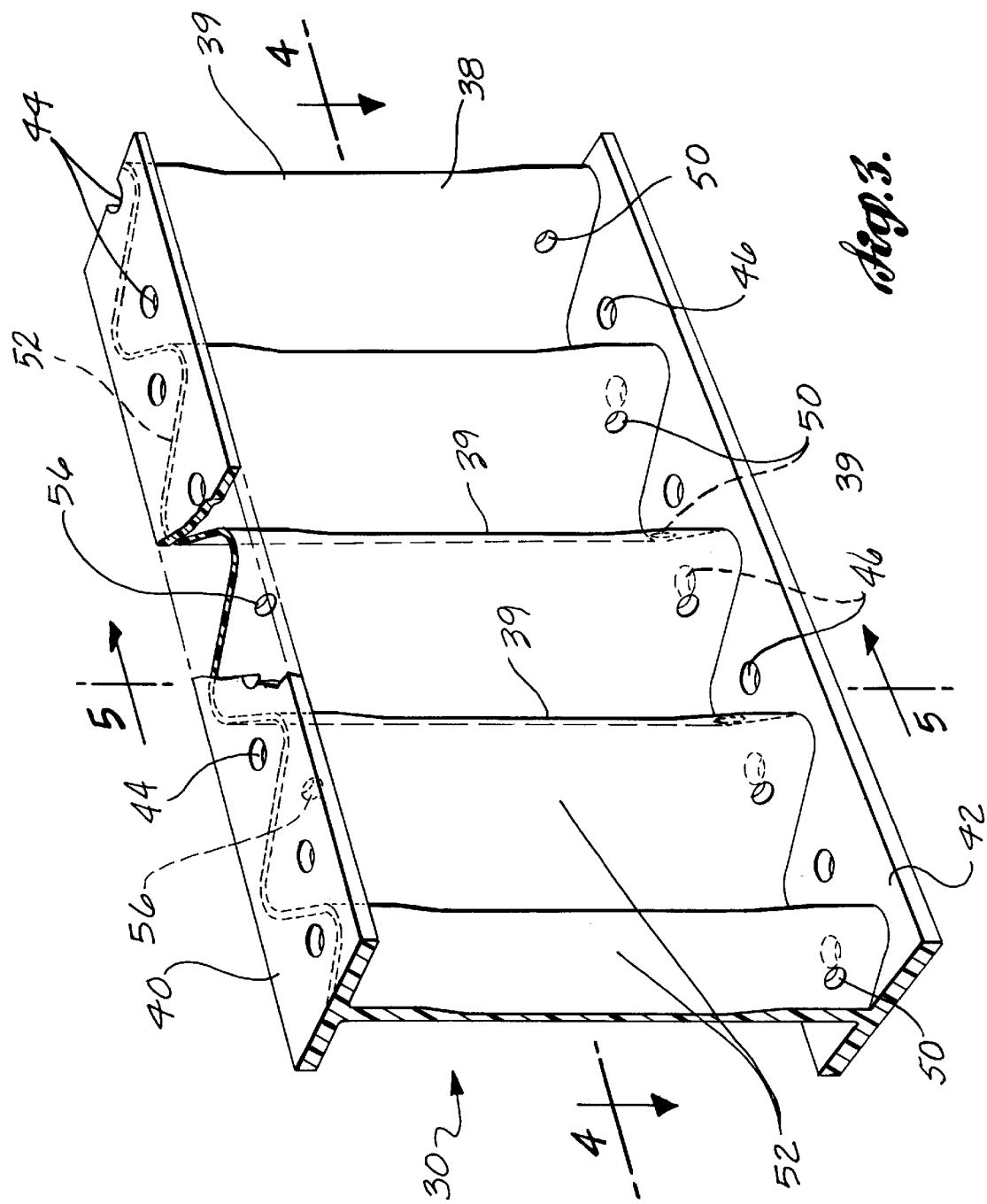
FIG. 3 is a side perspective view of a corrugated web spar for use in the frame of FIG. 2 with sections removed for detail.
Figure 4:
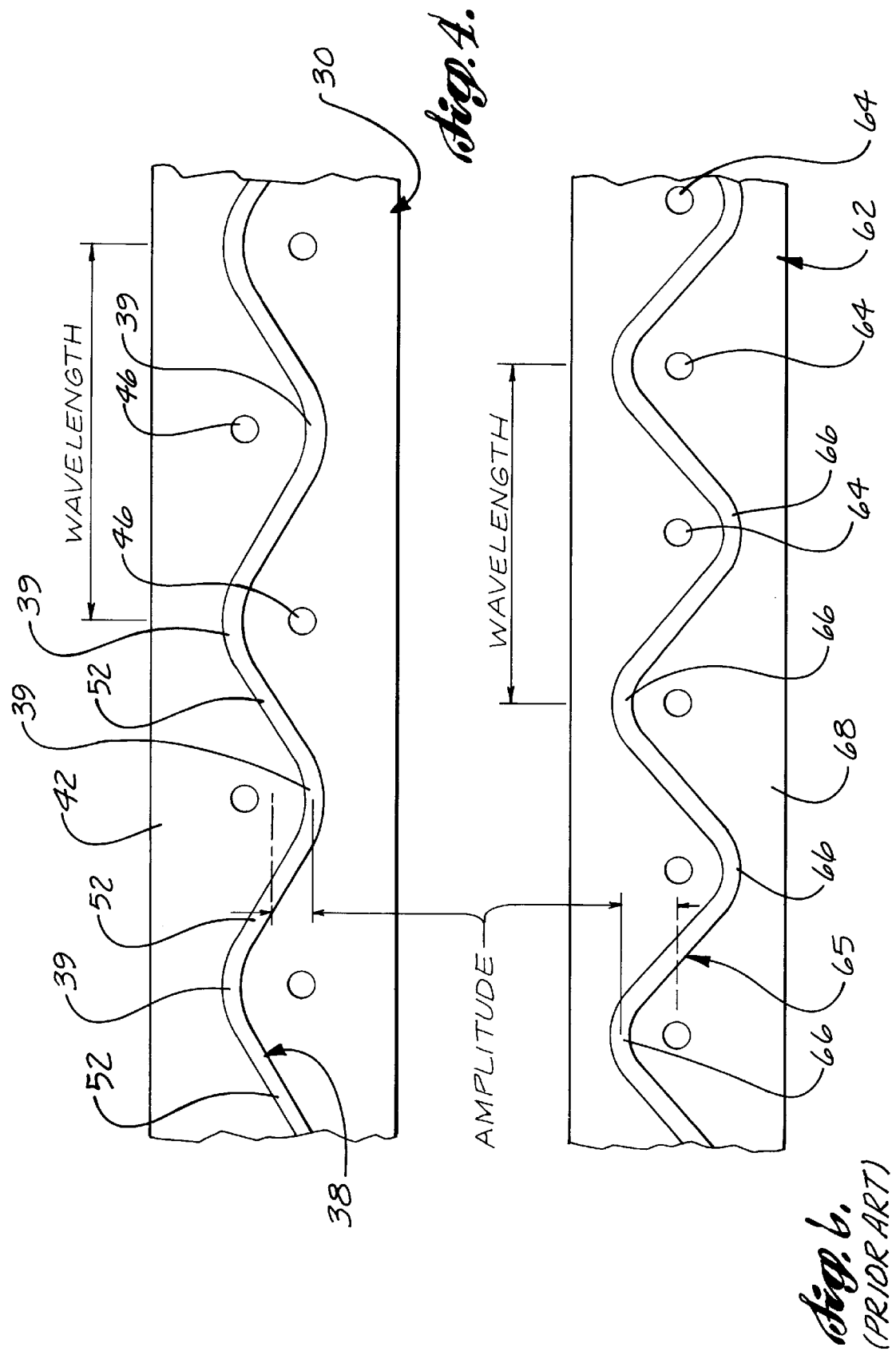
FIG. 4 is an elevational view along line 4—4 of FIG. 3.

A section of one of the corrugated web spars 30 is shown in detail in FIG. 3. The corrugated web spar 30 includes a corrugated web 38 having a sinusoidal pattern of corrugations 39. The corrugated web 38 is integrally formed with a top flange 40 and a bottom flange 42. As can best be seen in FIG. 5, the top flange 40, the bottom flange 42, and the corrugated web 38 form an I-beam structure with the corrugated web 38 forming the central portion or web of the I-beam. The top flange 40 includes fastener holes 44 (FIG. 3) bored therethrough. Likewise, the bottom flange 42 includes fastener holes 46 (FIG. 4) bored therethrough.

Typically flush head fasteners (not shown, but well known in the art) are used to secure the skins 25 to the spars 30. The flush head fasteners are countersunk in the wing skins 25 so a smooth aerodynamic surface is achieved. The flush head fasteners are retained by nuts or nut plates inside the wing. The fastener holes 44, 46 are adapted to receive the fasteners. The fasteners extend through the bottom skin 25 of the airplane wing and through the bottom fastener holes 46. Nuts or collars (not shown) are attached in a manner known in the art to the ends of the fasteners lying beside the corrugated web. Since there will be no access to the spar 30 when the second (upper) skin 25 is mated to the internal frame 26, nut plates (not shown, but well known in the art) are riveted or attached to the top flange 40 of the spars 30. The nut plates include a female threaded hole and are mounted in alignment with the fastener holes 44 in the top flange 40. As is known in the art, after the bottom skin 25 is attached to the bottom flange 42 of the spar 30, additional fasteners are used to attach the top wing skin 25 to the spars 30. The additional fasteners extend through holes in the top skin of the wing 24, through fastener holes 44 and into the female threaded holes in the nut plates. The fasteners are tightened to securely fasten the skins 25 to the spars 30. Alternatively, the upper wing skin 25 could be fastened to the upper spar flange 40 using nuts first, and then the lower wing skin 25 could be fastened to nut plates in the lower spar flange 42 second.

Figure 5:
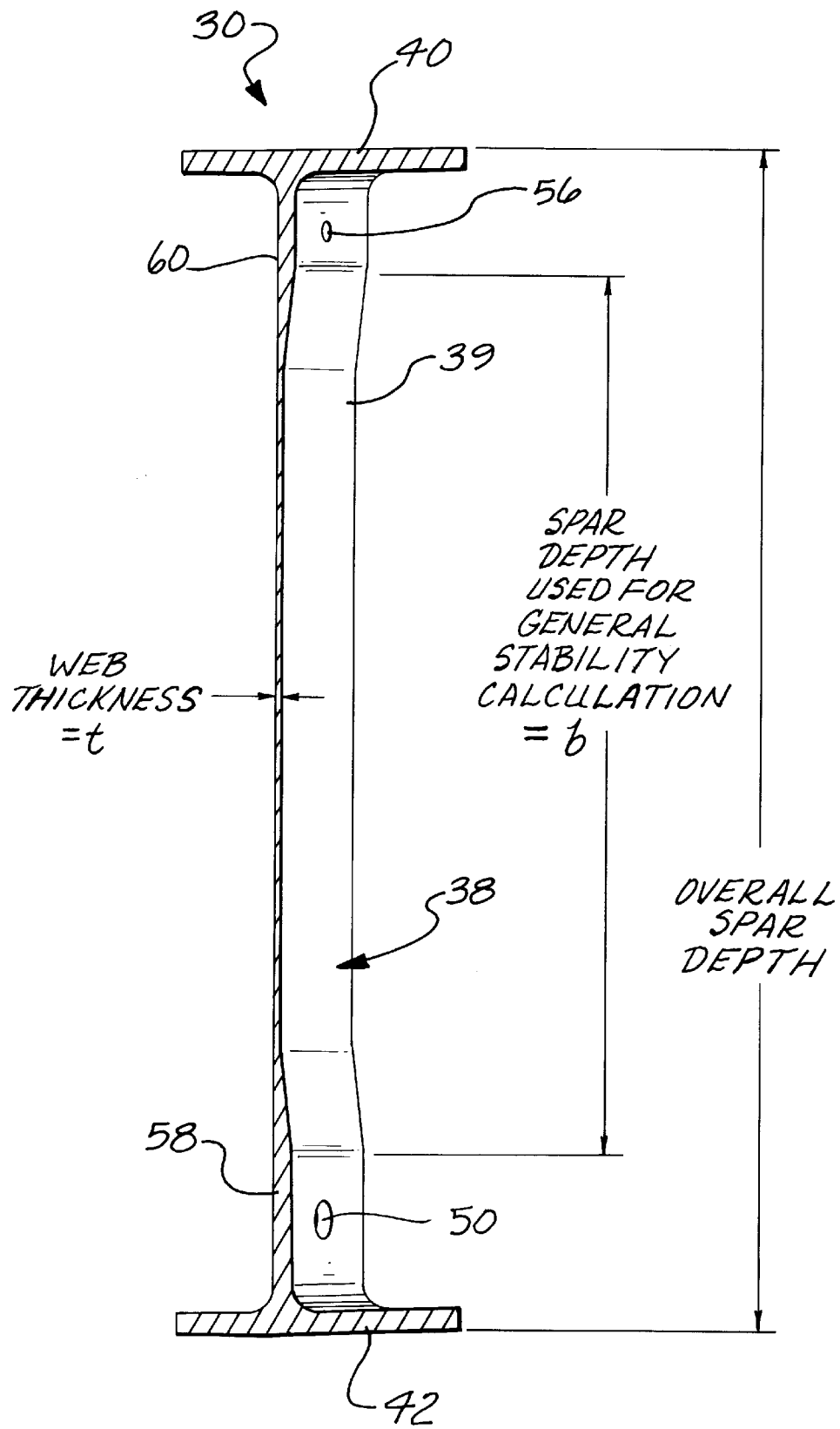
FIG. 5 is a side view along line 5—5 of FIG. 3.

The corrugated web 38 includes fuel holes 50 (FIG. 3) drilled through the flat 52 part of the web (FIG. 4) near the bottom of the corrugations 39, and vent holes 56 drilled along the top of the flat parts 52. It is preferred that the flat parts 52 be wide enough to allow the fuel and vent holes 50, 56 to be located on the flat parts and not on the curved surfaces of the corrugations 39 of the corrugated web 38. The fuel holes 50 and vent holes 56 aid in the circulation of the fuel within the wings 24 to a fuel line (not shown, but well-known in the art). The fuel holes 50 are preferably ½ inch in diameter, and the vent holes 56 are preferably ¼ inch in diameter. As shown in FIG. 5, preferably, the corrugated web 38 includes thickened portions 58, 60 at its bottom and top, respectively, to account for weakening of the structure due to the addition of the holes 50, 56 located at the bottom and top portions of the corrugated web.

FIG. 6 is an elevational view of the bottom half of a prior art corrugated web spar 62. As with the corrugated web spar 30 of the present invention, the prior art corrugated web spar 62 includes fastener holes 64, a corrugated web 65 having corrugations 66, a bottom flange 68, and a top flange (not shown). However, unlike the corrugated web spar 30 of the present invention, the fastener holes 64 in the prior art corrugated web spar 62 are arranged linearly down the center of the bottom flange 68. This arrangement requires that the corrugations 66 have a minimum corrugation amplitude in order for the fasteners not to interfere with the corrugations 66 of the corrugated web 65. The angles formed at the corrugations 66 are severe enough that a corrugated web spar 62 manufactured from a woven graphite fiber web composite is difficult to manufacture.

It has been discovered that a corrugated web spar would be easier to manufacture if either the wavelength of the corrugations was increased, and/or the amplitude of the corrugations was reduced. Either of these changes still require that the fastener pattern still be structurally acceptable. In the embodiment of the invention shown in FIGS. 3–5, the amplitude of the corrugations 39 has been reduced, and the fastener holes 44, 46 have been offset from the spar center line. The specific design for the corrugations 38 set forth in the drawings is not required. There are several different web corrugation designs that may be created by changing wavelengths, amplitudes, or arc radii of the corrugations. By reducing the amplitude of the corrugation to only that required for general stability, a person of skill in the art can create a spar meeting the structural and dimensional requirements for a particular application.

How the amount the amplitude of the corrugations 39 can be minimized is affected by the required general stability of the wing structure. As is known in the art, general stability of a corrugated web spar is defined by the following equation:

$$\text{General Stability} = 4K_s \left[ \frac{(D_1 D_2^3)^{1/4}}{b^2} \right]$$

where $$K_s = 8.17 + 5 \left[ \frac{D_3}{(D_1 D_2)^{1/2}} \right]$$

$b$ = spar depth $$D_1 = D_{11} \left( \frac{p}{p^1} \right) \quad \frac{p}{p^1} = \text{ratio of pitch to length along corrugation}$$

$D_2 = (A_{22}/t)I_y \quad t$ = web thickness

-continued $D_3 = 2(D_{66})$  $I_y$ = area moment of inertia of corrugation $A_{22}, D_{11}, D_{66}$ = values from the web laminate stiffness matrix As can be seen by the above equation, the main variables affecting general stability of a corrugated web spar are web thickness (t), spar depth (b), and corrugation area moment of inertia ($I_y$). Corrugation area moment of inertia ($I_y$) is dependent upon the amplitude and wavelength (FIG. 4) of the corrugations 39, and can be calculated by one of many computer programs that are well known in the art. The A and D values are from matrices which represent the extensional stiffness and flexural stiffness of a laminate. These values can be calculated, or are readily available to a person of skill in the art, for the laminate composite chosen for the corrugated web spars 30.

The spar depth (b) is determined generally at the maximum depth of the majority of the wing. For a supersonic fighter, typically 80 percent of the wing is shallower than 9.0 inches. In determining the spar depth (b), the thickened portions 58, 60, are not used. In the example shown in the drawing, these thickened portions are approximately 1 inch long. Therefore, the spar depth (b) used for the general stability calculation for the spar 30 used in a supersonic fighter is 7 inches.

Web thickness (t) is determined by the required shear flow of the spar 30. Shear flow is the load carried by the spar 30 divided by the overall spar depth (FIG. 5). A typical design ultimate load (DUL) shear flow requirement would be less than 1,000 lbs./inch. For the woven graphite fiber web composite used in the spar 30, a thickness of approximately 0.05 inches is adequate to withstand DUL shear flows less than 1,000 lbs./inch. To achieve this thickness, six prepreg laminas of the woven graphite fiber web were cured to form the corrugated web 38. These prepreg laminas are cured along with adequate laminas to form the top and bottom flanges 40, 42 and the thickened portions 58, 60. A person of skill in the art can choose the desired method of formation of the corrugated web spars 30, using methods which are appropriate to the graphite fiber web and matrix material chosen.

As discussed earlier, spar fastener spacing is usually in the range of five to seven times the fastener diameters. An exemplary fastener spacing has been found to be 1.25 inches. This fastener spacing works for both 0.190 inches and 0.250 inches diameter fasteners. The most commonly used wing skin-to-spar fasteners have these diameters. The web corrugation wavelength is twice the fastener spacing, or 2.5 inches.

After the web thickness, spar depth, and corrugation wave length are determined as set forth above, the corrugation amplitude is calculated by using the general stability equation. The desired general stability may be a predetermined value, or may be determined as a relative value to the DUL. For example, if it is desired that a corrugated web spar 30 be designed such that shear or pristine strength failure would occur prior to a general stability failure, then the spar must be stable to points greater than the rated DUL shear flow. One way of assuring this relationship is to make the calculated general stability failure occur at a shear flow twice as high as the DUL shear flow. In such a case, a corrugation amplitude could be chosen which is great enough to keep the spar stable to approximately 200 percent of its rated DUL shear flow. Using this approach, the amplitude of the corrugated web spar 30 having the dimensions described above is approximately 0.28 inches.

A corrugated web spar 30 having the dimensions described above provides flats 52 with sufficient room for the fuel and vent holes 50, 56. The flats 52 are also of sufficient size to allow attachment of brackets and to accept repair fasteners as needed.

If fasteners are used, the fasteners are offset the minimum required distance from the spar web so as not to interfere with the corrugations 39. The minimum required distance is that distance which accounts for manufacturing tolerances, and allows for a repair fastener (presumably of larger size than the standard fastener) to be installed in the spar without interfering with the web. The minimum required offset would be different for a 0.190 inch diameter fastener than a 0.250 inch diameter fastener. Fasteners are offset the minimum required distance to provide a spar with greater stiffness and "pull-off strength" and to minimize spar weight by minimizing flange widths 40 and 42. However, it is not necessary for the top and bottom wing skins to be attached to the corrugated web spar 30 by fasteners, the skin could instead be attached by bonding, co-curing, or other methods which are well known in the art.

While this invention has been described in detail with particular reference to preferred embodiments thereof, it will be understood that variations and modifications can be affected within the spirit and scope of the invention as described herein before and as defined in the appended claims. For example, the corrugated web spar 30 of the present invention could be used in empennage for an airplane or in other parts of the airplane needing structural stiffness.

The embodiments of the invention in which an exclusive property or privilege is claimed are defined as follows:

1. A corrugated web spar for use as a support structure in an airplane, comprising:

a top flange;

a bottom flange;

a corrugated web extending between the top flange and the bottom flange, the corrugated web including corrugations having an amplitude which is substantially equivalent to a minimum amplitude required for a desired general stability for selected web spar depth, web thickness, and corrugation wave length, the corrugation wave length being determined by a desired fastener spacing for the corrugated web spar, and fasteners holes in the top and bottom flanges for attaching the skin of the airplane to the corrugated web spar, the fasteners holes being offset on the top and bottom flanges from the central plane of the corrugated web the minimum required distance so that the fasteners do not interfere with the web corrugations of the corrugated web spar and adjacent fasteners.

* * * * *